United States Patent [19]
Yabiki et al.

[11] Patent Number: 5,268,357
[45] Date of Patent: Dec. 7, 1993

[54] FEED AND FEED ADDITIVE FOR LIVESTOCK, POULTRY AND NURSERY FISHES FOR INCREASING DISEASE, PUSEDORABIES RESISTANCE

[75] Inventors: Terutake Yabiki, Sakura; Tsunao Narahashi, Kashiwa; Toshihiro Okamoto, Urayasu; Ken Matsuo, Tsukuba, all of Japan

[73] Assignee: National Federation of Agricultural Co-operative Associations, Tokyo, Japan

[21] Appl. No.: 745,846

[22] Filed: Aug. 16, 1991

[30] Foreign Application Priority Data

Mar. 13, 1991 [JP] Japan ................................. 3-74841

[51] Int. Cl.$^5$ .............................................. A23K 1/00
[52] U.S. Cl. ...................................................... 514/8
[58] Field of Search ............................................ 514/8

[56] References Cited

U.S. PATENT DOCUMENTS 4,079,133 3/1978 Dress et al. ........................ 514/170
4,777,042 10/1988 Toda et al. ........................... 424/79

OTHER PUBLICATIONS

Wooley et al. Am. J. Vet. Res. vol. 42 (1) 1981 pp. 87–90.

Primary Examiner—Merrell C. Cashion, Jr.
Assistant Examiner—Choon Koh
Attorney, Agent, or Firm—Keck, Mahin & Cate

[57] ABSTRACT

A feed for livestock, poultry and fishes for increasing a disease, pseudorabies resistance wherein a bile powder and bacterial cell containing peptidoglycan are mix in a basic feed in order to reduce losses due to infectious diseases including pseudorabies, by increasing the physical function of livestock, poultry and fishes using as little medicine as possible; and a feed additive for livestock, poultry and fishes including bile powder and bacterial cells containing peptidoglycan.

4 Claims, No Drawings

FEED AND FEED ADDITIVE FOR LIVESTOCK, POULTRY AND NURSERY FISHES FOR INCREASING DISEASE, PUSEDORABIES RESISTANCE

BACKGROUND OF THE INVENTION

The present invention relates to a feed and feed additive for livestock, poultry and nursery fishes for increasing disease resistance, particularly, pseudorabies resistance, which comprise safe and natural substances having health improvement and weight gain effects.

Pseudorabies is an acute infectious disease caused by a kind of herpesvirus, which is called Aujeszky's disease derived from the name of inventor who identified the virus.

The disease shows a local and sharp itching symptom on infected animals such as cattle, horse, goat, sheep, rabbit, dog, cat, mink, fox, rat and so forth except swine. The disease paralyzes the a medulla, pharynx and chaps, and causes salivation, dyspnea, abnormal heart beating and death. Reared swine are infected easily, but almost all of them recover from the disease. In a highly humid region, many infected swine in 30 to 80 Kg. of weight have complications with pneumonia and die. Generally, the death rate due to the disease is high in piglets.

In the fields of livestock, poultry and fish, the economic loss caused by diseases due to a poor sanitary environment is very high. This is especially so in the field of swine breeding, which increases in scale every year. A death rate of 1% or more or a product loss of dressed carcass results is a serious negative factor.

For example, in a livestock farm having 100 female pigs, each of which breeds 12 piglets twice a year, the yearly production of the farm will be calculated as 2,400 piglets in total. However, if each mother pig loses three piglets at each breeding, 600 piglets will be lost in total. If the unit price of the piglets is ¥10,000 when they are sold to a slaughter-house, it means a loss of ¥6,000,000 a year. Accordingly, control of the health of piglets is an important factor in running a livestock farm.

When symptoms of Aujeszky disease appears in piglets, they must be immediately isolated from healthy piglets or disposed of in order to prevent further infection of the healthy piglets. Non-infected piglets kept a closed hogpen must be transferred to a larger space. Infected breeders, hogpens, utensils, feeds and so forth must be disinfected to prevent further infection. The sick piglets must be dosed with a large amount of antibiotics, synthetic antimicrobial substances, vitamins, minerals or eutrophic medicines in order to prevent complications of the respiratory organs such as pneumonia.

Further, attenuated vaccine or inactive vaccine has been dosed experimentally.

Increased medication is not effective and causes a depreciation of commercial value of livestock products and a reduction of safety due to residual medicines.

Vaccination prevents diseases, but does not prevent infection or carrying of a wild strain of a disease.

In livestock farms, It is impossible to resolve all diseases (including pseudorabies) by using vaccination and antibiotic medicines. If it could be done, it would require many kinds of medicines and great expenses.

SUMMARY OF THE INVENTION

The present invention has been developed considering the above situation and provides a feed and feed additive resulting in an improvement of the health of livestock, poultry and fish, and a reduction of economic loss due to those infectious diseases including pseudorabies by strengthening a physical functions and increasing a disease resistance thereof.

In order to carry out the above object, it has been found that a bile powder and bacteria powder containing peptidoglycan contributes to reduce the accident rate of livestock and so forth, and to improve the productivity of dressed carcasses when they are used together.

That is to say that the present invention relates to a feed and feed additive containing a mixture of bile powder and bacteria powder containing peptidoglycan or an effective composition thereof for increasing disease and pseudorabies resistance of livestock, poultry and fish.

The aforementioned feed and feed additive may contain at least one of animal blood plasma (serum) powder, garlic powder, licorice and quillaja extract.

The term "domestic animal" used here includes swine, cattle, horse, goat, sheep, deer, dog, cat and some useful rodent. The term "poultry" used here includes chicken, hen, quail, turkey, guinea fowl and so forth. The term "nursery fishes" used here includes carp, rainbow trout, ayu (sweet fish), eel, tilapia, conger, salmon, trout, red seabream, yellow tail, flounder, globefish, prawn and so forth.

The bile powder can be obtained by directly pulverizing a bile element contained in cattle and swine gall bladders including by pulverizing the gall bladders after exraction by an alcohol extracting method. The principal ingredients contained in the aforementioned feed additives or feeds are cholic acid and deoxycholic acid. About 50% of cholic acids is contained in the bile powder.

Various refined products of cholic acid, containing a bile powder composition, have been used as medicine for human gall and a secretory accelerator of digestive enzymes and digestive fluids.

The bile powder has the same or a better effect against virus than cholic acids obtained by extracting or refining the bile powder. Therefore, there is an economy in using the bile powder than in using cholic acids extracted or refined from bile powder.

The cell wall of Gram positive bacteria contains a peptidoglycan (hereinafter, its abbreviation "PG" will be used) of sack form of which the main composition is polysaccharide or teico acids bonded through covalent bonding. The cell wall of gram positive bacteria circumscribes a cytoplasmic membrane to protect its function from outer stimulant objects. Especially, a peptidoglycan portion thereof is important for increasing an immunity effect and supports its structural form.

The peptidoglycan has various bioactivities, of which minimum effective structure functioning as a biological response modifier is of N-acetylmuramyl-L-Ala-p-isoGln (MDP). The PG and MDP activate T cells and B cells, but do not act directly on lymphocytes. However, they activate macrophages (M$\phi$) to have a lymphocyte activating factor (IL-1) emitted as a primary target. Consequently, the T cell is activated to activate the B cell. Accordingly, an immunity effect on domestic animals, poultry and so forth can be obtained sufficiently by adding gram positive bacteria to feed, from which a capsules is eliminated.

Licorice, garlic powder, quiliaja extract and animal blood serum powder are auxiliary ingredients for increasing disease resistance of the mixture of bile powder and peptidoglycan bacteria.

Licorice (*Glycyrrhizae glabra*) is a plant of the pulse family, of which the root is dried and crushed or pulverized, and an extract thereof is a dark brown and adhesive extract having a particularly sweet and bitter flavor. However, its color varies according to the extracting process. Its main composition is a glycyrrhetic acid having a natural killer activity and an interferon inductivity, having an effect againt human simplex herpes virus which is widely recognized. The licorice powder and an extract thereof abosrbed in other foods are added to livestock feed.

Garlic powder is made from garlic (Allium Scorodoprasum L. var. viviparum Regal) by drying and pulverizing the cloves. The garlic powder contains a glycoside of glycominar. When it is hydrolyzed, a kind of volatile oil conatining sulfur and diaryl-disulfide, an aromatic substance, is obtained. Also, the garlic powder contains allysine and has physiological activity such as an improvement of intestinal absorption of vitamin $B_1$.

Quillaja extract is a white to light yellowish brown powder or brown to dark brown pasty substance having a surface activity and has been used as a detergent and foaming agent for a long time. The main composition of the quillaja extract is an oligoglycoside such as triterpenoid and steroid. An extract of Quillaja saponaria molina, an evergreen tree of the rose family, is mainly used to get the quillaja extract. When the quillaja extract is employed, the quillaja powder is mixed with feed directly, and a pasty quillaja powder can be absorbed in a feed.

Animal blood plasma (serum) contains an important immunoglobulin, with which animals protect themselves from invading pathogenic microbes. The immunoglobulin is a kind of protein which is capable of restraining functions of invading pathogenic microbes or killing them.

Generally, new born animals such as baby pigs and baby cattle have an extremely low capacity for producing immunoglobulin while suckling. Therefore, the immunoglobulin received from the initial milk of the mother animal is absorbed through an intestinal tract of the baby animal and distributed to the whole body by the blood so as to protect the body from microbes (containing virus).

In some kind of animals, the immunoglobulin is transmitted from the placenta of the mother animal to the blood of the baby animal through the umbilical cord so as to protect the baby animal when it is born.

The immunoglobulin contained in orally dosed blood plasma (serum) as a feed additive is absorbed through an intestinal tract of the baby animal and distributed to the whole body by the blood so as to protect the body from virus just like the immunoglobulin contained in the initial milk of the mother animal.

The immunoglobulin not absorbed through the intestinal tract covers the surface of the intestinal canal mucosa so as to protect against various viruses invading into the intestinal tract.

The aforementioned substances are mixed so as to be a feed additive as follows:

It is necessary to prepare a bile powder mixture on the basis of dry weight of the bile powder and other materials such as one part of bile powder to 0.0001 to 0.01% of PG, one part of bile powder to 0.1 to 2.0% of garlic powder, one part of bile powder to 0.001 to 0.1% of glycyrrhetic acid value of licorice or licorice extract and one part of bile powder to 0.001 to 0.01% of triterpenoid (*Quillaja saponin*) value of quillaja extract. The mixture rate of blood plasma powder in a feed must be 0.01 to 5.0%.

When these feed additives are mixed in a feed directly, its content must be chosen in the range of 0.01 to 2.0%, and the content of blood plasma powder in a feed must be in the range of 0.01 to 5.0%, preferably feed additive in the range of 0.05 to 0.5% and blood plasma powder in the range of I to 0.05% by considering the weight, age and palatability of the domestic animals, poultry or fishes.

Also, other commercial materials sold as a feed or feed additive for domestic animals, poultry and fishes can be used for preparing the mixture of bile powder and blood plasma powder considering the race, age, weight, nutrition and palatability of the domestic animals, poultry and fishes. It is necessary for the feed for domestic animals, poultry and fishes to contain vitamins and minerals of course, which may be mixed or added as well as other commercial materials.

The feed and feed additive for the domestic animals, poultry and fishes may be of powder, grain or liquid form. They are used selectively in accordance with the feeding condition and installations of the farm.

Pseudorabies or other infectious diseases can be prevented by applying the feed or feed additive according to the present invention in a feed, and the health, weight gain effect and productivity of the domenstic animals, poultry and fishes can be improved.

Also, the feed and feed additive according to the present invention are safe and do not cause secondary effects due to environmental pollution.

DETAILED DESCRIPTION OF THE PREFERRED EMBODIMENTS

Hereinafter, the present invention will be described in detail referring to some examples of embodiments as follows, by which the concept of the present invention will not be limited.

Embodiment No. 1

Feed additives A (with 30% of bile powder) and B (with 30% of bile powder and 0.1% of PG) were prepared and each 0.2% thereof were added in a commercial swine feed.

In a livestock farm infected by pseudorabies virus, wherein swine showed cough, diarrhea and a high death rate, a group of 10 piglets of two-weeks age borne by a dam pig infected by pseudorabies positive virus were fed with a feed with common feed additive A containing bile powder for 60 days. Another group of 10 piglets were fed with a feed with feed additive B containing bile powder and PG according to the present invention for 60 days. The diarrhea rate (feces condition), weight gain and survival rate of the both groups were compared with those of 10 piglets fed with common commercial feed for the same period, of which result is shown in Table 1.

We can see from the above table that those piglets fed with a feed with feed additive B containing bile powder and PG according to the present invention showed an excellent pseudorabies resistance in comparison to those fed with a common feed or fed with a feed with common feed additive A containing only bile powder.

Embodiment No. 2

Feed additives A (with 25.0% of bile powder), B (with 0.1% of PG), C (with 25.0% of bile powder, 0.1% of PG and 1.5% of licorice and D (with 25.0% of bile powder, 0.1 4 of PG, 10% of garlic powder, and 0.6% of licorice) were prepared and each 0.2% thereof were added in a common commercial feed.

In a livestock farm having 90 sows show about 75% of pseudorabies positive rate, cough, diarrhea and high death rate, three groups of 20 pseudorabies positive piglets of 50 to 60 days old were fed with same common commercial feeds respectively containing the feed additives A, B, C or D till the time of shipping to a slaughterhouse, of which death rate and dressed cascass rate were compared with those of 20 piglets fed with a common commercial feed for the same period. The result of comparison is shown in Table 2.

We can see from Table 2 that the death rates in the groups of piglets respectively fed with a feed with feed additive C or D containing bile powder and PG are lower than those fed with a common feed, a feed with feed additive A containing bile powder and a feed additive B containing only PG by 5.0 to 20.0%.

Regarding the dressed carcass rate, those fed with a feed with the feed additive C or D showed an increase of 57.1% to 71.4% more in comparison to those fed with a common feed, and also, showed an increase of 22.2% to 33.3% in comparison to those fed with feed with the additives A or B.

A feed containing the feed additives A with bile powder and another containing the feed additive B with PG increase pseudorabies resistance, but a feed containing the feed additives C or the feed additive D according to the present invention has much higher pseudorabies resistance.

Embodiment No. 3

Feed additives A (with 12% of bile powder), B (with 1% of PG), C (12.0% of bile powder, 0.1% of PG and 10.0% of garlic powder) and D (12.0% of bile powder, 0.1% of PG, 12.0% of garlic powder and 0.5% of licorice) acccording to the present invention were prepared. These feed additives were respectively added in common commercial swine feeds by 0.2%.

Group 1 of 10 pseudorabies positive sows were fed with a common commercial feed without any additive from copulation to estrus through parturition and weaning periods.

Group 2 of same 10 were fed with a feed with feed additive A during the same period.

Group 3 of same 10 were fed with a feed with feed additive B during the same period.

Group 4 of same 10 were fed with a feed with feed additive C according to the present invention during the same period.

Group 5 of same 10 were fed with a feed with feed additive D according to the present invention during the same period.

The total number of piglets born dead or aborted, average of new piglets, average of weaned piglets and number of days from weaning to next estrus were compared for the five groups, of which the results are shown in Table 3.

The table 3 shows a clear difference between the groups 1 to 3 and other groups 4 and 5 fed with a feed with feed additive C or D according to the present invention as follows:

In both cases of a feed additive A containing 12% of bile powder and a feed additive B containing 0.1% of PG, the total number of piglets born dead or aborted 3 was reduced to 1 showing a reduction of 33.3%. The average number 9.6 of new piglets was increased to 10.3 and 10.8 showing increases of 7.3% and 12.5% respectively. The average number 6.8 of weaned piglets was increased to 9.2 and 10.1 showing increases of 35.2% and 49.5% respectively. The number 6 to 9 (average: 9) of days till next estrus was shortened to 6 to 10 (average 8, −11.1%) 5 to 10 (average 7.5, −16.7%) respectively.

However, in both cases of the feed additives C and D both containing 12% of bile powder, 0.1% of PG and licorice, the number 3 of new piglets born dead or aborted was reduced to zero showing an improvement of 100%. The number 9.6 of new piglets was increased to 11.2 and 13.5 showing increases of 16.7% and 40.6% respectively. The number 6.8 of weaned piglets was increased to 10.4 and 11.9 showing increases of 52.9% and 75.0% respectively. The number of days 9 till next estrus was reduced to 6.5 and 5.5 showing reductions of 27.8% and 35.9% respectively. This is an effect of the mixture of bile powder, PG and garlic powder according to the present invention. Especially, the feed additive D containing 12% of bile powder, 0.1% of PG, 12.0% of garlic powder and 0.5% of licorice shows the best result.

It is possible to observe heat season by dosing hormornes such as prostaglandin, but if a feed containing the feed additive according to the present invention is used, the heat season can be observed without dosing such hormones.

Embodiment No. 4

Feed additives A (with 12.0% of bile powder and 0.2% of PG), B (with 12.0% of bile powder, 0.2% of PG and 20.0% of garlic powder), C (with 12.0 -o of bile powder, 0.2% of PG and 1.0% of quillaja extract) and D (with 12.0% of bile powder, 0.2% of PG, 20.0% of garlic powder and 5.0% of licorice) were prepared and each 0.2% thereof were added in a common commercial feed.

In a livestock farm showing a high death rate and a low productivity, four groups of 10 piglets of 10 to 15 days old were fed with feeds with the feed additive A, B, C or D for 50 days. Then, the feces, weight gain and survival rate of the groups of piglets were compared with another group of 10 piglets fed with a common feed, of which result is shown in Table 4.

In this case, those groups of piglets fed with a feed with feed additive A, B, C or D showed an excellent effect in comparison to other group fed with a common feed. A feed additive with bile powder and PG showed a sufficient effect, but a better effect was obtained by using a feed with feed additive with bile powder, PG, garlic powder and licorice.

Embodiment No. 5

Feed additives A (with 16% of bile powder and 0.01% of PG) and B (with 15% of bile powder, 0.01% of PG and 1% of licorice) were prepared and each 0.5% thereof were added in a common comercial feed.

Three groups of 20 new born chickens of Shaver layer family were fed with a common comercial feed, a feed with feed additive A and another with feed additive B respectively for 35 days. Regarding the productivity of 18iquid immunity, immunoglobulin values IgG of the groups were measured by a single radial immunodiffusion method and compared each other.

Also, a comparison was made on the death rates of the groups observed during above experiment, of which result is shown in Table 5.

The group fed with a feed with additive A shows a better result than the group fed with a common commercial feed. The group fed with a feed with feed additive B shows a much better result than others.

Embodiment No. 6

A feed additive containing 12.0 of bile powder, 0.1% of PG and 10.0% of garlic powder was prepared and 0.1% thereof was added on a commercial feed for rainbow trout. Two groups of 11 rainbow trouts were fed with a feed with the feed additive and with a commercial feed respectively for three weeks. Then, a lysozyme activity, an index of disease resistance of fishes, was searched of which result is shown in Table 6. The water temperature of tank was 15° C. and 12 g. of feed was given daily to each group.

The group of rainbow trouts fed with a feed with a feed additive according to the present invention showed a better disease resistance in comparison to another group fed with a commercial feed. The former group showed a lysozyme activity 14% higher than the later.

The feed and feed additive for livestock, poultry and fishes for increasing disease, pseudorabies resistance according to the present invention are not limited by the aforementioned embodiments.

TABLE 1

| group | weight gain | diarrhea | survival rate (%) |
|---|---|---|---|
| common feed | 100 | 100 | 60 (6/10) |
| feed with feed additive A containing bile powder | 109 | 83 | 90 (6/10) |
| feed with feed additive B containing bile powder and PG according to the present invention | 114 | 78 | 100 (10/10) | where weight gain: average weight gain of 6 piglets fed with a common feed and survived.
diarrhea: each scored 1 for watery feces, and averages were calculated considering an average of 6 piglets surviving for 60 days as a score of 100.

TABLE 2

| | (tested: groups of 20) | |
|---|---|---|
| group | death rate (%/dead) | dressed carcass (% of total) |
| common feed | 20.0/4 | 35.0 |
| common feed + feed | 10.0/2 | 45.0 |

TABLE 2-continued

| | (tested: groups of 20) | |
|---|---|---|
| group | death rate (%/dead) | dressed carcass (% of total) |
| additive A 0.2% with bile powder 25.0% | | (+28.6%) |
| common feed + feed additive B 0.2% with PG 0.1% present invention | 5.0/1 | 45.0 (+28.6%) |
| common feed + feed additive C 0.2% with bile powder 25.0%, PG 0.1%, licorice 1.5% | 0.0/0 | 55.0 (+57.1%) (+22.2% comparing with additives A & B) |
| common feed + feed additive D 0.2% with bile powder 25.0%, PG 0.1%, garlic powder 10%, licorice 0.6% | 0.0/0 | 60.0 (+71.4%) (+33.3% comparing with additives A & B) |

TABLE 3

| | (tested: groups of 10) | | | |
|---|---|---|---|---|
| group | born dead aborted (%) | average born (%) | weaned (%) | days to next estrus (avrage:%) |
| common feed | 3 | 9.6 | 6.8 | 6 to 12 (9) |
| common feed + feed additive A 0.2% with bile powder 12% | 1 (−33.3%) | 10.3 (+7.3%) | 9.2 (+35.2%) | 6 to 10 (8:−11.1%) |
| common feed + feed additive B 0.2% with PG 0.1% present invention | 1 (−33.3%) | 10.8 (+12.5%) | 10.1 (+48.5%) | (7.5:−16.7%) (7.5:−16.7%) |
| common feed + feed additive C 0.2% with bile powder 12%, PG 0.1%, garlic powder 10.05% | 0 (−100%) | 11.2 (+16.7%) | 10.4 (+52.9%) | 4 to 9 (6.5:−27.8%) |
| common feed + feed additive D 0.2% with bile powder 12%, PG 0.1%, garlic powder 12.0%, licorice 0.5% | 0 (−100%) | 13.5 (+40.6%) | 11.9 (+75.0%) | 4 to 7 (5.5:−38.9%) |

TABLE 4

| | (tested: group of 10) | | |
|---|---|---|---|
| group | weight gain | diarrhea (%) | survival rate % (survived) |
| common feed | 100 | 100 | 70 (7/10) |
| present invention | | | |
| common feed + feed additive A 0.2% with bile powder 12.0%, PG 0.2% | 118 | 34 | 100 (10/10) |
| common feed + feed additive B 0.2% with bile powder 12.0%, PG 0.2%, garlic powder 20.0% | 114 | 42 | 100 (10/10) |
| common feed + feed additive C 0.2%, with bile powder 12.0%, PG 0.2%, quillaja extract 1.0% | 116 | 35 | 100 (10/10) |
| common feed + feed additive D 0.2%, with bile powder 12.0%, PG 0.2%, garlic powder 20.0%, licorice 5.0% | 120 | 28 | 100 (10/10) | where weight gain: An average weight gain of 7 survived for 50 days was considered as a score of 100.
diarrhea: each scored 1 for thin or watery feces, and averages were calculated considering an average of 7 survived for 50 days as a score of 100.

TABLE 5

| | (tested: groups of 20) | |
|---|---|---|
| group | serum IgG content | death rate % (dead) |
| common feed | 156 (100%) | 15.0 (3/20)* |
| present invention | | |
| common feed + feed additive A 0.5% bile powder 16%, PG 0.01% | 258 (165%) | 0.0 (0/20) |
| common feed + feed additive B 0.5% bile powder 15%, PG 0.01%, | 289 (185%) | 0.0 (0/20) |

TABLE 5-continued

| | (tested: groups of 20) | |
|---|---|---|
| group | serum IgG content | death rate % (dead) |
| licorice | | |

*Three died of infectious Bursal Disease, IBD.

TABLE 6

| | lysozyme activity (μg/ml) |
|---|---|
| common feed | 1.15 |
| feed with feed additive according to the present invention | 2.76 (+ 14.0%) |

What is claimed is:

1. A feed additive for livestock, poultry and/or fish for increasing pseudorabies resistance, which comprises a combination of bile powder and peptidoglycan from cell walls of gram-positive bacteria.

2. A feed additive of claim 1 in combination with at least one member selected from the group consisting of animal plasma (serum) powder, garlic powder, licorice, licorice extract and quillaja extract.

3. A feed for livestock, poultry and fish having an effective amount of an additive to increase pseudorabies resistance, the additive comprising a combination of a bile powder and peptidoglycan from cell walls or gram-positive bacteria.

4. A feed of claim 3 further comprising at least one member selected from the group consisting of animal plasma (serum) powder, garlic powder, licorice, licorice extract and quillaja extract.

* * * * *